United States Patent [19]

Erickson

[11] 4,310,503

[45] Jan. 12, 1982

[54] HYDROGEN PRODUCTION BY MULTISTAGED INTERMEDIATE OXIDATION-REDUCTION

[76] Inventor: Donald C. Erickson, 1704 S. Harbor La., Annapolis, Md. 21401

[21] Appl. No.: 560,342

[22] Filed: Mar. 21, 1975

[51] Int. Cl.³ .............................................. C01B 1/08
[52] U.S. Cl. ..................................... 423/657; 423/658
[58] Field of Search ................................ 423/657, 658

[56] References Cited

U.S. PATENT DOCUMENTS

| | | | |
|---|---|---|---|
| 1,345,905 | 7/1920 | Abbott | 423/658 |
| 1,658,939 | 2/1928 | Parsons | 423/658 |
| 2,449,635 | 9/1948 | Barr | 423/658 |
| 2,635,947 | 4/1953 | Reed et al. | 423/658 |
| 3,017,250 | 1/1962 | Watkins | 423/658 X |
| 3,442,619 | 5/1969 | Huebler et al. | 423/658 |
| 3,442,620 | 5/1969 | Huebler et al. | 423/658 |
| 3,761,352 | 9/1973 | Souriau | 423/657 X |

OTHER PUBLICATIONS

Sargent–Welch Table of the Elements (2 Sheets), 1968, Sargent–Welch Sc. Co., Chicago, Illinois.

*Primary Examiner*—O. R. Vertiz
*Assistant Examiner*—Wayne A. Langel

[57] ABSTRACT

Steam is reformed (i.e. reduced) to hydrogen in two or more successive stages by chemical reaction with intermediates, at least one of which is selected from tin, indium, germanium, molybdenum or $WO_2$. The oxidized intermediate is regenerated to its original composition by reducing gas in one or more stages. With this multistaged processing in the proper sequence, the proportion of steam converted to hydrogen and the proportion of reducing gas utilized for reduction can both be increased over what is possible in single stage processes.

4 Claims, 3 Drawing Figures

HYDROGEN PRODUCTION BY MULTISTAGED INTERMEDIATE OXIDATION-REDUCTION

BACKGROUND OF THE INVENTION

The field of art of this invention is the one encompassing processes in which hydrogen is produced in elemental form by a chemical reaction between water in any state and a metal or metallic compound. The field is further defined in that the metal or metallic compound which is consumed (i.e. oxidized) in the above reaction is regenerated by reaction with a carbonaceous reducing composition. Thus this field is distinguished from thermochemical processes and from processes in which the metal is regenerated electrolytically. The field is further defined in that the reaction with $H_2O$ is caused to occur in at least two successive stages, the second stage having a higher equilibrium $pH_2/pH_2O$ value than the first.

Typical prior art related to the field of this invention is described in U.S. Pat. Nos. 3,442,620, 3,821,362, and 3,859,373.

Some of the problems existing in the prior art practice of this field of invention are as follows. One prior art process using a successive two-stage reaction with $H_2O$ has a first stage using the $Fe_3O_4$-$FeO$ equilibrium, and a second using the $FeO$-$Fe$ equilibrium. All nongaseous species are present in the pure state, i.e. at essentially unit activity, causing the equilibrum $pH_2/pH_2O$ of each stage to be uniquely determined by stage temperature. Stage temperature is constrained by other factors: fast enough reaction rate, below agglomeration temperature, process heat balance, etc. Therefore complete equilibrium conversion has not been possible, owing to mass balance effects, and even if equilibrium conversion could be attained, the available values of equilibrium $pH_2/pH_2O$ do not necessarily yield the optimum process results achievable in two stages. A third successive stage of oxidation is inherently not possible with pure iron or iron compounds, as the $Fe_3O_4$-$Fe_2O_3$ equilibrium has too low of an oxygen affinity. Also all the nongaseous reacting species in the iron process are in solid phase at process conditions, introducing difficult materials handling and transport problems regardless of what type of processing is used: fluidized bed, free fall, fixed bed, etc.

OBJECTS OF THE INVENTION

The general objects of this invention are to increase the yield of hydrogen obtainable from a given quantity of carbonaceous reducing composition; to achieve simultaneously a greater degree of steam conversion to hydrogen and a greater degree of reducing gas utilization than is available in any single stage intermediate oxidation-reduction process or is available in the two stage steam-iron process; to make possible a process of more than two contributing stages; and to make possible multistaged processes which do not require conventional complex solids handling techniques. Other objectives, features, and advantages are made evident throughout the following specification.

SUMMARY OF THE INVENTION

These objects and other beneficial effects are acieved by a multistaged process based on intermediates such as solid germanium, tungsten dioxide, or molybdenum, and liquid or dissolved liquid tin, indium, germanium, iron, or zinc, either singly or in combination. The successive stages are arranged in order of increasing equilibrium $pH_2/pH_2O$ values for the oxidation reaction with steam. The nongaseous oxide containing compositions produced in the oxidation stages are reduced in successively arranged reduction stages (not necessarily the same number of stages) in which the equilibrium $pH_2/pH_2O$ values are decreasing.

THERMODYNAMIC BACKGROUND OF THE INVENTION

The process of this invention consists essentially of a double exchange of chemically bound oxygen. First it is exchanged between $H_2O$ and the metal or metallic compound, forming hydrogen and an oxide of the metal or metallic compound. Then the chemically bound oxygen is exchanged between the oxide and a reducing gas containing CO and $H_2$, forming the original metal or metallic compound while oxidizing the $H_2$ and CO to $H_2O$ and $CO_2$. The metal or metallic compound is not consumed, but is strictly and intermediate, it being oxidized in the first reaction and the oxide being reduced in the second. Thus the net overall reaction is $H_2O$ plus reducing gas reacting to hydrogen plus exhaust, with the very important side effect that impurities in the reducing gas are not introduced into the hydrogen. Both reactions are equilibrium limited, i.e. quantitative conversion of the gas phase reactants can not occur. The term used to express the equilibrium point of any stage, be it oxidation or reduction, is the equilibrium $pH_2/pH_2O$ value, where pX is the partial pressure of gaseous species X.

The steam conversion fraction, or simply steam conversion (C) is given by $$C = pH_2/(pH_2 + pH_2O)$$

The reducing gas quality (Q) is given by $$Q = (pCO + pH_2)/(pCO + pCO_2 + pH_2 + pH_2O)$$

Letting the equilibrium $pH_2/pH_2O$ values be denoted by R, the following relation holds at equilibrium:

$$C = R/(1+R)$$

If in addition to equilibrium, the temperature is also 1092° K., then
$$Q_{exh} = R/(1+R) = C$$

where $Q_{exh}$ is the quality of the (exhaust) reducing gas in equilibrium with a reaction stage having equilibrium R.

The term "carbonaceous reducing composition" normally means a reducing gas containing CO and $H_2$ in any proportions, as for example producer gas, synthesis gas, low BTU gas, etc. However the term encompasses various other compositions which have been described in the prior art for achieving carbothermic reduction: raw mixtures of fuel, air, and steam; reducing gas carburetted with additional carbonaceous fuel, etc.

The thermodynamic theory and terminology used in this specification is explained succinctly in *Introduction to Metallurgical Thermodynamics* by D. R. Gaskell, McGraw-Hill, 1973.

A "nongaseous intermediate capable of exchanging chemically bound oxygen with $H_2O$ and $CO_2$" is defined as a nongaseous species of matter, which satisfies two criteria at some temperature in the temperature range 700° K. to 1300° K.: first, that when it is contacted with steam at some pressure in the range of 1 to 500 atmospheres, some of the nongaseous intermediate will acquire chemically bound oxygen from the $H_2O$ by being oxidized and reducing some of the $H_2O$ to hydrogen, and the equilibrium $pH_2/pH_2O$ value which results if equilibrium is allowed to be established is greater than 0.05; and second, that when the oxidized nongaseous intermediate so formed is contacted with a gas, which is at a pressure in the range of 1 to 50 atmospheres and which contains CO and $H_2$ in any proportions and which has a $pH_2/pH_2O$ greater than the equilibrium $pH_2/pH_2O$ value referred to above and less than 10, the CO and $H_2$ of the gas will acquire chemically bound oxygen from the oxidized nongaseous intermediate by reducing some of the oxidized nongaseous intermediate to the original nongaseous intermediate and oxidizing some of the CO and $H_2$ to $CO_2$ and $H_2O$. This term frequently will be abbreviated to "nongaseous intermediate" or simply "intermediate". When appropriate, more particular descriptors such as "solid", "pure liquid", or "dissolved liquid" will be used in place of "nongaseous".

The following substances are intermediates:
pure solids—iron, wustite, tungsten dioxide, molybdenum, germanium;
pure liquids—tin and indium;
dissolved liquids—tin, indium, germanium, zinc, and iron.

Indium, germanium, and zinc are preferably used in the temperature range of 700° K. to 1050° K.; the others are preferably used in above 900° K., and above 1000° K. for pure tin or above 850° K. for tin catalyzed by zinc or indium. Pure means that the intermediate is present at essentially unit activity, and does not necessarily preclude it from being mixed with other intermediates or oxides. Dissolved means that the intermediate is present at less than unit activity. The effect of dissolving an intermediate is to decrease the equilibrium $pH_2/pH_2O$ value applying to that intermediate at a fixed temperature, provided the stable oxide of the intermediate is still at essentially unit activity. Suitable solvents can be selected from the list copper, lead, and bismuth, plus tin can also serve as a solvent for indium. Zinc or gallium, preferably zinc, can be added to any of the above intermediates to act as a catalyst. The zinc is simply dissolved in the liquid intermediates. Solid intermediates such as iron can also be catalyzed by zinc or zinc oxide.

As a standard of comparison, the following R values are achieved at 1000° K. by the intermediates previously cited: pure germanium, 0.1; pure tin, 0.51; pure iron, 0.74; pure $WO_2$, 1.0; pure FeD (wustite), 1.63; pure molybdenum, 3.65; pure indium, 5.67; dissolved zinc, 4 and greater; dissolved germanium, 0.05 to 0.1; and dissolved iron, 0.1 to 1. In all cases the R value decreases with increasing temperature. Some of these, particularly germanium and indium, would preferably be operated at lower temperatures than 1000° K. in order to limit the loss of intermediate as vapor. In all cases reaction pressures greater than ambient and preferably greater than 10 atmospheres are desired in order to limit vaporous loss of intermediate, to increase reaction rate, and to make better utilization of the process inventory of intermediate.

DESCRIPTION OF THE PREFERRED EMBODIMENTS

In all embodiments this invention consists of contacting steam with a first nongaseous intermediate, such that some of the steam is reacted to hydrogen, then contacting the steam hydrogen mixture with at least a second nongaseous intermediate which has an equilibrium $pH_2/pH_2O$ higher than the first, such that additional steam reacts to hydrogen, and then reducing the oxides of nongaseous intermediates which were formed in the above reactions back to the intermediates by contacting the oxides with a carbonaceous reducing composition. There are several embodiments of the process when it is limited to only two oxidation stages. First a simple embodiment will be described, and the optimum choice of R values will be derived. Then an example will be given illustrating how optimum R values are obtained through choice of intermediates. The results of this teaching will be compared to the results of prior art teachings. Finally other possible embodiments for a two oxidation stage process will be described, including the advantages of slurried intermediates and of mixed intermediates.

Figure 1:
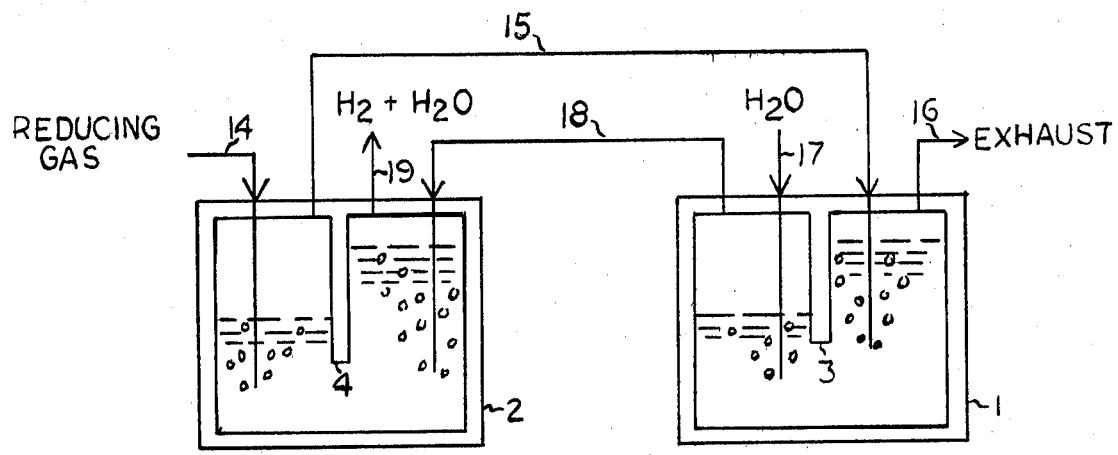
FIG. 1 is a schematic illustration of a process in which one intermediate reacts in the first oxidation and second reduction stage, a second intermediate reacts in the second oxidation and first reduction stage, and the two intermediates do not mix.

In FIG. 1 container 1 contains a slurried liquid intermediate and oxide having equilibrium $pH_2/pH_2O$ value $R_1$, and container 2 contains a slurried liquid intermediate and oxide with equilibrium $R_2$, where $R_2$ is greater than $R_1$. Each container is divided by a baffle, 3 and 4 respectively, into an oxidation region and a reduction region. $H_2O$ is introduced into the slurry in the oxidation region of container 1 through conduit 17, where some steam is converted to hydrogen. The resulting gaseous mixture is conveyed to the oxidation region of container 2 and introduced into the slurry there by conduit 18, where additional steam is converted to hydrogen. The resulting gas mixture is withdrawn through conduit 19. Reducing gas introduced into conduit 14 is initially contacted with the slurry in the reduction region of container 2, where its quality is reduced as it reduces some of the oxide in the slurry. The resulting lower quality reducing gas is conveyed via conduit 15 to the reduction region of container 1, where its quality is further reduced by additional reduction reaction, and the resulting low quality exhaust is removed through conduit 16. Within each container, the slurry circulates between the respective oxidation and reduction regions, accomplishing a net transport of intermediate to the oxidation region and a net transport of intermediate oxide to the reduction region. Each slurry is confined to its own container, and the two slurries do not mix.

In order to illustrate the advantage of multistaging, assume that all reactions occur at 1092° K., and that $R_1=0.2$, $R_2=0.4$, and the reducing gas Q is 0.9. Further assume that substantially complete equilibrium is achieved wherever mass balance constraints will allow it.

The $H_2O$ is 20% converted to hydrogen in the first stage (slurry $R_1$), and undergoes an additional 20% conversion for a total of 40% in the second stage. The reducing gas entering the second stage (i.e. slurry $R_2$) could theoretically be reduced to 40% quality, and then further reduced to 20% quality in the slurry $R_1$. However this result could not be maintained in steady state conditions, since equal amounts of chemically bound oxygen are added to each slurry whereas only two fifths as much oxygen is being removed from slurry $R_1$ as from slurry $R_2$. The steady state condition would have a reducing gas of 0.55 quality exiting slurry $R_2$ and entering slurry $R_1$, in order that equal amounts of oxygen be removed from each slurry. That is, complete equilibrium cannot be maintained in the reduction region of container 2 owing to mass balance constraints. Nevertheless a 40% conversion of steam to hydrogen has been achieved simultaneously with an exhaust quality of 0.2. In a single stage process at the same temperature, slurry $R_1$ would yield the same low value of exhaust quality but the steam conversion would be limited to 20%, and slurry $R_2$ would yield the same high value of steam conversion but the exhaust would have the undesirably high quality of 0.4. In other words, in a single stage process the steam conversion essentially cannot exceed the exhaust gas quality, whereas this limitation does not hold for multistage processes.

The question arises, what is the optimum choice of R values for a two stage process? In particular, how can $R_1$ and $R_2$ be chosen to maximize the steam conversion obtainable for a given degree of reducing gas utilization, i.e. for a given value of exhaust gas quality $Q_{exh}$?

From a consideration of mass balance constraints, it can be shown that $$Q_{exh}Q - (Q_{exh})^2 = C^2 - CQ_{exh}$$

defines the maximum steam conversion attainable. The values for $R_1$ and $R_2$ are then given by $$R_1 = Q_{exh}/(1 - Q_{exh})$$

$$R_2 = C/(1 - C)$$

For example, for $Q = 0.9$ and $Q_{exh} = 0.15$, a steam conversion of 0.419 can be obtained by arranging the stages with $R_1 = 0.176$ and $R_2 = 0.72$. Other conditions may make it desirable to alter slightly these values; it is frequently not desirable for all reaction temperatures to be 1092° K., or the R values in the oxidation and reduction sides of a single stage may vary slightly. However the values obtained from the above derivation will never be far from the optimal ones.

One major aspect of these teachings is to demonstrate how stages with desired values of R can be obtained once the desired values are determined. A wide selection of possible intermediates has already been listed, along with approximate ranges of R values obtainable with each. Continuing the preceding example, wherein an $R_1$ of 0.176 and $R_2$ of 0.72 are desired, the following choices are available. The first stage intermediate could be pure solid germanium at 840° K.; wustite at 1280° K. (this is too hot-it would agglomerate); or dissolved tin, 0.15 activity at 1025° K. or 0.35 activity at 1125° K. For the second stage, the choices are: wustite at 1020° K.; pure tin at 945° K. (this low temperature would require a catalyst); $WO_2$ at 1200° K.; or dissolved indium, 0.13 activity at 1100° K. or 0.042 activity at 1000° K. The temperatures are gnerally not critical within 50° K. Thus the desired constant temperature process could be nicely obtained using either dissolved tin plus dissolved indium or dissolved tin plus FeO. If significant variation in stage temperature can be achieved (last reduction stage hotter than last oxidation stage), even better results could be obtained.

A known prior art two stage process consists of the pure solid Fe–FeO equilibrium in the first stage, and the pure solid $FeO$–$Fe_3O_4$ equilibrium in the second stage. In order to achieve rapid enough reaction rates and yet not experience agglomeration of the solid particles and loss of activity, the temperatures of both reactions are constrained to the range 1050° K. to 1150° K. Since the respective intermediates are present at unit activity, the R values are uniquely fixed by temperature, and are approximately 0.41 and 1.62, i.e. steam conversions of 29% and 62% respectively. The most serious drawback of this is the high quality of the exhaust-0.29. Also, mass balance constraints prevent the steam conversion from exceeding 50% from a reducing gas of 0.9 quality, whereas an optimal two stage process would achieve 59% steam conversion under these conditions. In the prior art process, the reaction temperatures cannot be varied far enough to achieve desirable R values, owing to other constraints on temperature. However, using the present teachings wherein the choice of R can be made independent of temperature, it is possible to design not only improved two stage processes, but also the theoretically optimal two stage process for any set of process conditions. Furthermore, it will be seen that it is possible to continue to increase the number of stages, choosing R values such that every added stage makes a positive improvement. Thus there is no longer any theoretical limit to the degree of completeness of both the oxidation and reduction reactions in the same porcess; the only limits encountered are the practical design limits which arise when trading off efficiency vs. complexity.

It is essential to the success of the process that the successive stages which the oxidizing gas (steam or steam plus hydrogen) contacts be arranged in ascending order of $R_1$, $R_2$, etc., and the reducing stages contacted successively by the reducing gas be arranged in descending order of R. Any stage out of sequence will cause one or more stages not to function.

The intermediates in FIG. 1 were illustrated as being slurried liquids. It is to be recognized that either or both could have been solids. For solid intermediates, a more complex stage is required in which the oxidation and reduction regions are kept physically separate and the solid is transported between them. The slurry approach is preferred when process conditions allow it—it forms a liquid seal for the separate gas phase reactants, enabling a simple container with baffle or other simple configurations to be used, and it diminishes or virtually eliminates transport difficulties.

When a pure liquid intermediate is used in one stage and a different intermediate is used in another, the two intermediates must not be allowed to mix, as otherwise a solution would form and the one would no longer be pure. FIG. 1 illustrates one configuration with no mixing. When dissolved liquid intermediates are used, a mixed configuration is also possible. A slurry containing a dissolved liquid intermediate and its stable oxide can be circulated through successive oxidation stages and then through successive reduction stages, as is illustrated in part of FIG. 2, to be described later. The slurry or melt flow must be stagewise countercurrent to both the steam flow and the reducing gas flow, although reactant flow within a single stage does not necessarily have to be countercurrent. The changing R values necessary for successive stages are achieved by the changing activity levels of the dissolved intermediate as it is either oxidized out of solution or reduced back into solution. The slurry could also contain more than one dissolved intermediate, such that different ones account for the bulk of the reaction occurring in different stages. For example, a slurry with a liquid solution containing 10 a/o indium, 60 a/o tin, 30 a/o copper enters the second oxidation stage; exiting that stage and entering the first oxidation stage, the liquid solution is depleted of 9 a/o of its indium content, making its proportions 1 a/o indium, 66 a/o tin, and 33 a/o copper; exiting the first oxidation stage, 10 a/o of its tin has been depleted, leaving its proportions as 1 a/o indium, 26 a/o tin and 73 a/o copper. The symbol a/o is an abbreviation for atom percent.

The various solid phase intermediates can be arranged in a serial circulation pattern countercurrent to the gas flows also, provided that the formation of solid intermetallic compounds is not excessive. Examples would be a mixture of $WO_2$ and FeO particles, or Mo and $WO_2$ particles, or $WO_2$ and Ge particles, etc. When this serial circulation approach is adopted, the correct order of stage R values will automatically be established, provided that the flows of gaseous reactants to the various stages are regulated to the approximate stoichiometric amount necessary to completely react each successive intermediate or oxide within its appropriate stage.

Another embodiment in which there are two oxidation stages uses a single pure intermediate which circulates through both oxidation stages, then through a single reduction stage, and then through an optional cooling heat exchanger. One oxidation stage is hotter than the other; intermediate flow is from the cooler stage to the hotter stage and oxidizing gas flow is from the hotter stage to the cooler stage. In that arrangement, part of the exothermic heat of the oxidation reaction is used to preheat the intermediate enroute to the reduction stage, where a high temperature is desirable, whereas the final oxidation stage traversed by the oxidizing gas is at a cooler temperature yielding a proportionately greater steam conversion.

Additional advantages can be derived from multistaged processes incorporating three or more stages of oxidation. First consider those processes wherein only solid intermediates are used. Five solid intermediates have been identified; they are, in order of increasing R: germanium (Ge), wustite (FeO), tungsten dioxide ($WO_2$), iron (Fe), and molybdenum (Mo). Thus a five-stage all-solid process is possible with the intermediates arranged in that order for oxidation. Five different four-stage processes are possible, obtained by eliminating any one of the five intermediates individually. Ten three-stage processes can be established, consisting of intermediates in the following orders: Ge-FeO-$WO_2$, Ge-FeO-Fe, Ge-FeO-Mo, Ge-$WO_2$-Fe, Ge-$WO_2$-Mo, Ge-Fe-Mo, FeO-$WO_2$-Fe, FeO-$WO_2$-Mo, FeO-Fe-Mo, and $WO_2$-Fe-Mo. Similarly nine new two-stage processes can be established ranging from the Ge-FeO combination to the Fe-Mo combination.

The liquid and dissolved liquid intermediates can be combined in multistage processes the same as the solid intermediates can, however, even more possibilities are present since the same dissolved intermediate can be present in two or more different stages at different activity levels or concentrations. When it is considered that multistaged processes can be established which include both solid and liquid intermediate stages, it can be seen that virtually any number of contributing stages can be arranged with any desired R values at any desired temperatures.

In processes with three or more oxidation stages, different stage arrangements can also be used advantageously.

Figure 2:
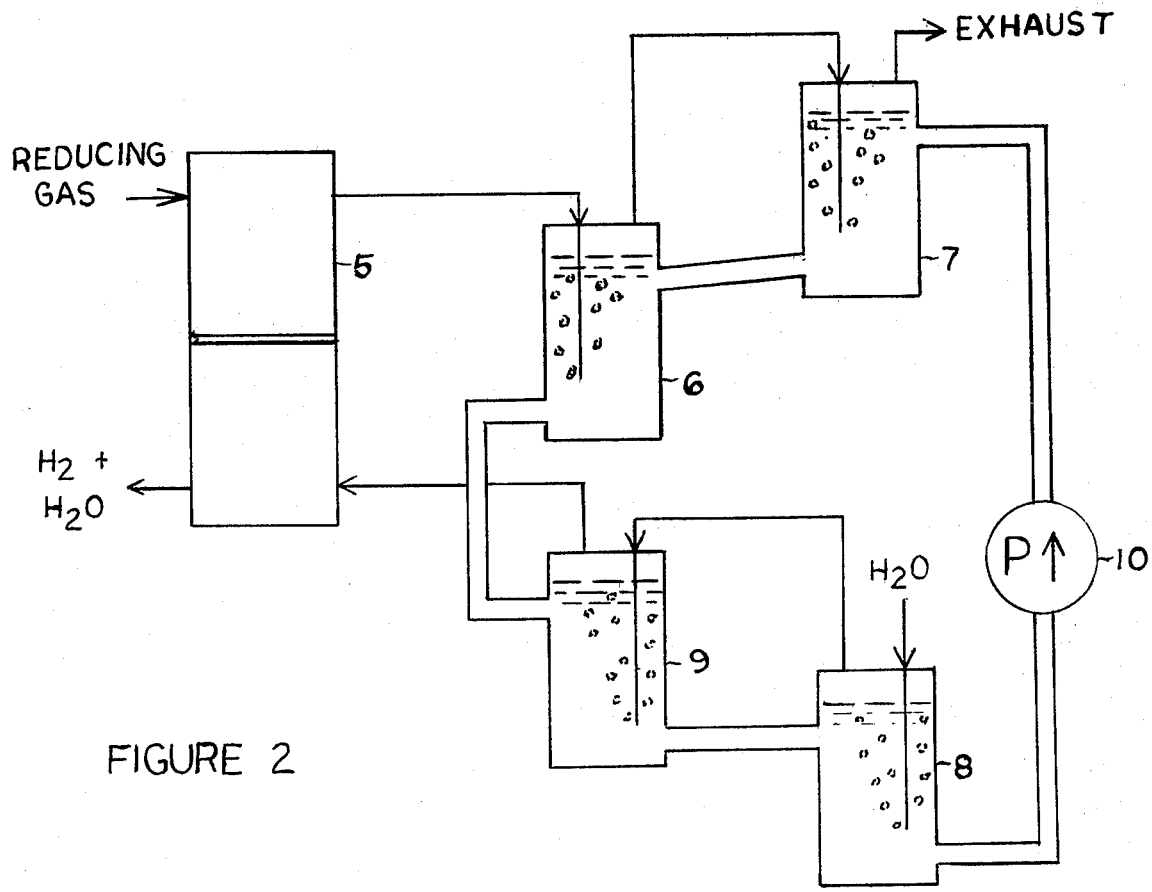
FIG. 2 is a three stage process in which mixed intermediates circulate through and react in the second and third reduction stages and the first and second oxidation stages, and an unmixed intermediate reacts in the first reduction stage and third oxidation stage.

FIG. 2 depicts the combination of a single stage of unmixed intermediate having low R value with two additional stages of higher R value which contain one or more intermediates in serial circulation around the stages. Container 5, containing an intermediate which is confined to that container alone can be similar in configuration or function to either of the two containers of FIG. 1. In container 5 are the third oxidation stage and the first reduction stage. Containers 6 and 7 form the second and third reduction stages respectively, and containers 8 and 9 form the first and second oxidation stages respectively. A pump 10 or other means of transport circulates the nongaseous intermediates countercurrent to the gas flows, or counterclockwise in the figure. Steam is routed successively through the first, second, and third oxidation stages, while reducing gas is routed successively through the first, second, and third reduction stages.

The flow of gaseous reactants between stages can be accomplished by compressors or the like, or it can be accomplished by incorporating pressure drops across the stages. FIG. 2 illustrates the latter approach, which when using a slurried intermediate requires that the slurry elevations of each stage be staggered in height.

In many processes, mass balance constraints prevent achieving full equilibrium conversion of one or the other of the gaseous reactants. Thus, it may be advantageous to add or delete some amount of gaseous reactant flow in the middle of either the oxidation sequence or the reduction sequence. This would enable all gaseous reactant streams exiting any stage of reaction to be in essentially complete equilibrium, and would have the effect of reducing the total volume of gas reacted in one or more reaction stages for a given volume of product. The same beneficial effect could be achieved by the series-parallel multistage arrangement depicted in FIG. 3.

Figure 3:
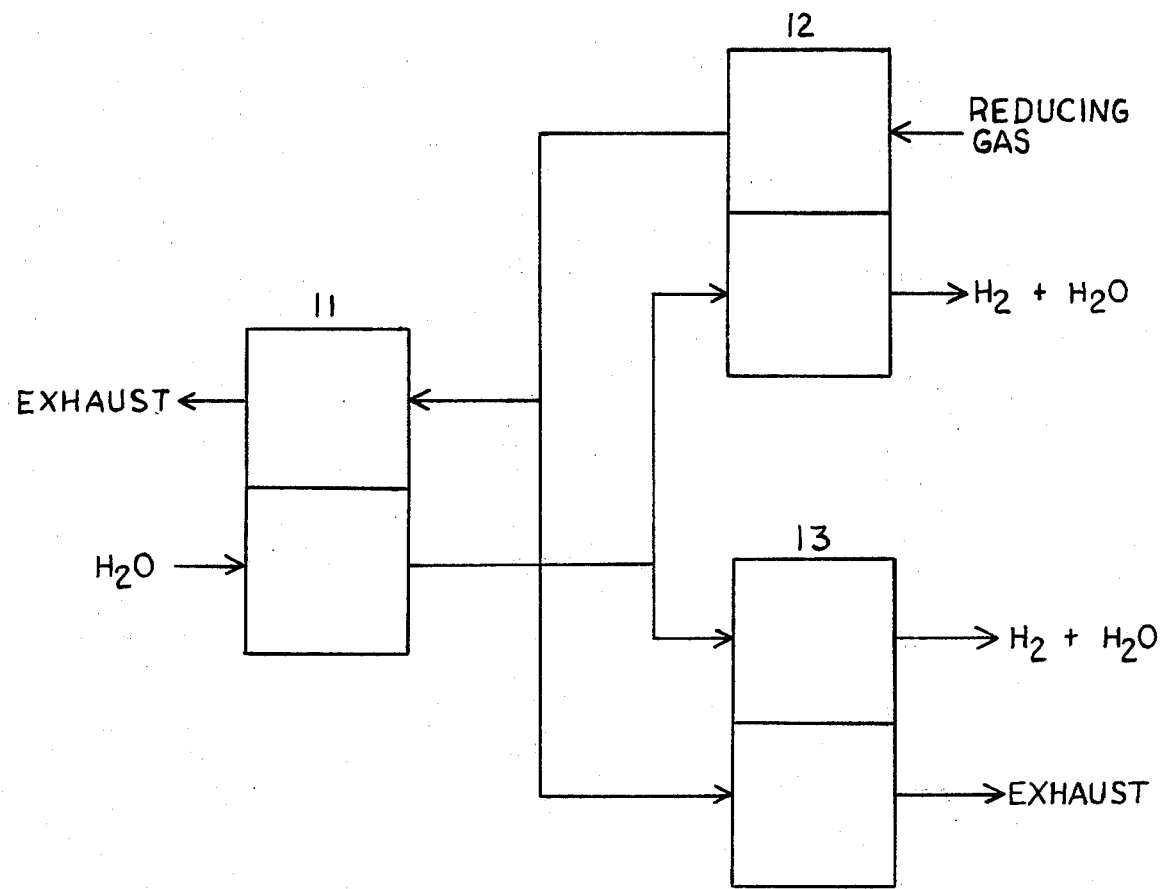
FIG. 3 illustrates a process involving split flow by both of the gaseous reactant streams: the reducing gas flow starts in series and ends in parallel, and so does the oxidizing gas ($H_2O$) flow.

In FIG. 3, container 11 represents the oxidation and reduction regions or stages of an intermediate having a low R, e.g. 0.2; the intermediate in container 13 has a higher R value, e.g. 0.6; and the intermediate in container 12 has the highest R value of the three: e.g. 1.5. The flow of oxidizing gas (initially $H_2O$) is all routed through the oxidation region of container 11, and then is split into two parts, one part going through the oxidation region of container 12, and similarly for container 13. In order to achieve more complete equilibrium conversion in all stages, the reducing gas flow is not strictly the reverse order. All the reducing gas is initially routed through the reduction region of container 12, and then part of the depleted reducing gas is routed through the reduction region of container 11, and the remainder through container 13.

I claim:

1. A process for generating a mixture of hydrogen and steam from a supply of steam and a carbonaceous reducing composition which comprises:

a. establishing a first and at least a second nongaseous intermediate capable of exchanging chemically bound oxygen with $H_2O$ and $CO_2$, wherein the intermediates are arranged in order of increasing equilibrium $pH_2/pH_2O$ values, whereby the equilibrium $pH_2/pH_2O$ value of the first nongaseous intermediate is lower than the equilibrium $pH_2/pH_2O$ value of the second nongaseous intermediate, and wherein the temperature and pressures of all the intermediates are maintained in the range of 700° K.–1300° K. and 1 to 500 atmospheres, and wherein at least one of the intermediates is tin, indium, molybdenum, or $WO_2$ and at least one other of the intermediates is molybdenum, $WO_2$, Fe, FeO, or tin, wherein the tin is dissolved in Cu, Pb, or Bi and wherein the solution containing the dissolved tin contains additionally a second dissolved liquid intermediate;

b. routing the supply of steam such that it sequentially contacts so as to react with the nongaseous intermediates in order of increasing equilibrium $pH_2/pH_2O$ values, whereby part of the steam is converted to hydrogen during contact with the first nongaseous intermediate, and an additional part is converted to hydrogen during contact with each subsequent nongaseous intermediate, and whereby part of each nongaseous intermediate is oxidized;

c. collecting the resulting mixture of hydrogen and steam;

d. routing the carbonaceous reducing composition such that it sequentially contacts so as to react with the oxidized nongaseous intermediates in order opposite to the order in which they were contacted with the steam, whereby each of the nongaseous intermediates is regenerated for reuse.

2. The process of claim 1 wherein there are at least three intermediates.

3. The process of claim 2 wherein the first intermediate is FeO, the second intermediate is $WO_2$ or Fe, and the third intermediate is Mo.

4. The process of claim 1 wherein the first intermediate is tin and the second intermediate is Fe or $WO_2$.

* * * * *